(12) United States Patent
Moon et al.

(10) Patent No.: US 8,804,070 B2
(45) Date of Patent: Aug. 12, 2014

(54) LIQUID CRYSTAL DISPLAY DEVICE BACKLIGHT INCLUDING AN INTERMEDIATE DIFFUSION MEDIUM

(75) Inventors: Jeong Min Moon, Goyang-si (KR); Eun Ju Kim, Seongnam-si (KR)

(73) Assignee: LG Display Co., Ltd., Seoul (KR)

( * ) Notice: Subject to any disclaimer, the term of this patent is extended or adjusted under 35 U.S.C. 154(b) by 484 days.

(21) Appl. No.: 13/227,975

(22) Filed: Sep. 8, 2011

(65) Prior Publication Data

US 2011/0317098 A1    Dec. 29, 2011

Related U.S. Application Data

(62) Division of application No. 11/984,989, filed on Nov. 26, 2007, now Pat. No. 8,023,067.

(30) Foreign Application Priority Data

Nov. 30, 2006   (KR) .................... P10-2006-0119794

(51) Int. Cl.
G02F 1/1335    (2006.01)

(52) U.S. Cl.
USPC .............. 349/64; 349/58; 349/62; 362/608; 362/355; 362/246; 362/558

(58) Field of Classification Search
USPC ........ 349/58, 62, 64, 112; 362/608, 355, 246, 362/558
See application file for complete search history.

(56) References Cited

U.S. PATENT DOCUMENTS

| | | | |
|---|---|---|---|
| 5,944,405 A | 8/1999 | Takeuchi et al. | |
| 6,970,226 B2 | 11/2005 | Yu et al. | |
| 7,471,037 B2* | 12/2008 | Park et al. | 313/493 |
| 7,611,262 B2 | 11/2009 | Chang | |
| 7,636,138 B2* | 12/2009 | Seong et al. | 349/62 |
| 2004/0257493 A1 | 12/2004 | Lim | |
| 2005/0162582 A1 | 7/2005 | Kitada et al. | |
| 2005/0248694 A1* | 11/2005 | Nakayama | 349/58 |
| 2006/0066773 A1 | 3/2006 | Huang | |
| 2006/0118797 A1* | 6/2006 | Masuyama et al. | 257/88 |
| 2006/0285352 A1* | 12/2006 | Kim | 362/558 |
| 2007/0200263 A1 | 8/2007 | Tazaki et al. | |

FOREIGN PATENT DOCUMENTS

| | | |
|---|---|---|
| KR | 10-2004-0110177 A | 12/2004 |
| KR | 20-0368753 | 12/2004 |
| KR | 10-2005-0063562 A | 6/2005 |
| KR | 20-0423202 | 8/2006 |

* cited by examiner

Primary Examiner — Huyen Ngo

(74) Attorney, Agent, or Firm — McKenna Long & Aldridge LLP (57) ABSTRACT

A liquid crystal display device includes a liquid crystal display panel and a backlight including a diffusion medium located between lamps and a diffusion plate to diffuse light. The diffusion medium includes an external band of square type diffusion medium and a plurality of ribs formed of the diffusion medium connected to both sides of the external band of square type diffusion medium. The ribs include a plurality of first ribs which are directly located over the lamps, a plurality of second ribs which are located between the first ribs, and a third rib which connects each of the ribs to each other.

6 Claims, 7 Drawing Sheets

LIQUID CRYSTAL DISPLAY DEVICE BACKLIGHT INCLUDING AN INTERMEDIATE DIFFUSION MEDIUM

This application is a divisional of U.S. application Ser. No. 11/984,989, filed Nov. 26, 2007, now U.S. Pat. No. 8,023,067 which is now allowed and claims the benefit of Korean Patent Application No. P2006-0119794, filed in Korea on Nov. 30, 2006, both of which are hereby incorporated by reference in their entireties for all purposes as if fully set forth herein.

BACKGROUND OF THE INVENTION

1. Field of the Invention

The present invention relates to a liquid crystal display device and a fabricating method thereof, and more particularly to a liquid crystal display device that may reduce manufacturing cost, contribute to a thin profile, and generate a uniform brightness, and a fabricating method thereof.

2. Discussion of the Related Art

Liquid crystal display devices are widely used due to their being light weight, having a thin profile and low power consumption, for example. As a result, the liquid crystal display device is used in office automation equipment and audio/video equipment, for example. The liquid crystal display device controls the amount of light in accordance with a signal applied to a plurality of control switches that are arranged in a matrix, thereby displaying a desired picture on a screen.

As such, the liquid crystal display device is not a self luminous display device, thus it requires a separate light source such as a backlight.

Backlights may be largely classified as either direct type or edge type in accordance with the location of a light source. The edge type backlight has a light source installed at the edge of one side of a liquid crystal display device, and the edge type backlight irradiates light from the light source to a liquid crystal display panel through a light guide plate and a plurality of optical sheets. The direct type backlight has a plurality of light sources disposed directly under the liquid crystal display device, and the direct type backlight irradiates light from the light sources to the liquid crystal display panel through a diffusion plate and a plurality of optical sheets.

Recently, the direct type backlight which has improved brightness, light uniformity and color purity, versus the edge type backlight, is more often used in LCD TVs.

Figure 1:
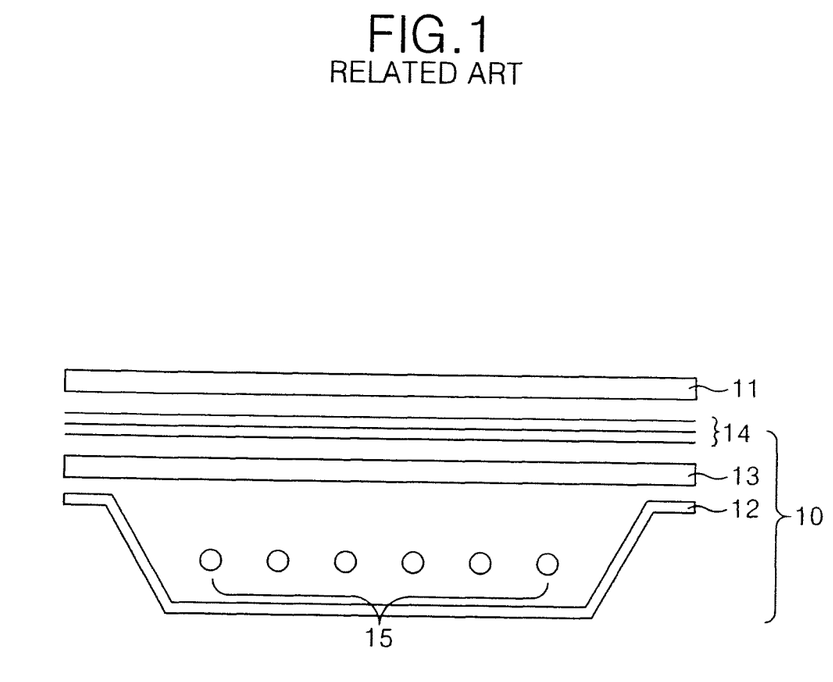
FIG. 1 is a diagram showing a liquid crystal display device of the related art.

FIG. 1 is a diagram showing a liquid crystal display device of the related art to which the direct type backlight is applied.

Referring to FIG. 1, the liquid crystal display device of the related art includes a liquid crystal display panel 11 and a backlight unit 10. Herein, the liquid crystal display panel 11 displays an image, and the backlight unit 10 irradiates light to the liquid crystal display panel 11.

A plurality of data lines and a plurality of gate lines (not shown in FIG. 1) are arranged to cross each other at the liquid crystal display panel 11. Liquid crystal cells are arranged in a matrix type between an upper substrate and a lower substrate. Furthermore, pixel electrodes and common electrodes (not shown), which apply an electric field to each liquid crystal cell, are formed at the liquid crystal display panel 11. Thin film transistors (not shown) are formed at a crossing part of the plurality of data lines and the plurality of gate lines. Herein, the thin film transistors TFT switch a data voltage to be applied to a pixel electrode in response to a scanning signal. Gate drive integrated circuits and data drive integrated circuits are electrically connected, via a tape carrier package TCP (not shown), to the liquid crystal display panel 11.

The backlight unit 10 includes a plurality of lamps 15, a bottom cover 12, a diffusion plate 13, and a plurality of optical sheets 14.

The lamps 15 are radiated by an AC high voltage from an inverter (not shown) to supply a light to the diffusion plate 13.

The bottom cover 12 is manufactured in a container structure where the plurality of lamps 15 are received at an inner space, and a reflection plate is formed at a bottom and a side surface of the inner space. The diffusion plate 13 is assembled together with the bottom cover 12. The diffusion plate 13 may include a plurality of beads, and disperses light, using the beads, which is incident from a lamp. Accordingly, the diffusion plate 13 can minimize a brightness difference which is generated by a distance difference between the liquid crystal display panel and the lamp and a distance difference between the lamps. Since the diffusion plate 13 is such that the beads are spread into a medium having the same refractive index, the diffusion plate 13 cannot condense light.

The optical sheets 14 include at least one diffusion sheet and at least one prism sheet to uniformly irradiate light incident from the diffusion plate 13 to an entire liquid crystal display panel 11. Furthermore, the optical sheets 14 diffract a light progressing path toward a vertical direction regarding a display surface of liquid crystal display panel 11 to condense a light to a front surface of display surface of the liquid crystal display panel 11.

The lamp 15 may largely be classified into a cold cathode fluorescent lamp (hereinafter, referred to as "CCFL"), an external electrode fluorescent lamp (hereinafter, referred to as "EEFL"), and a light emitting diode (hereinafter, referred to as "LED").

The liquid crystal display device of the related art keeps a distance between the liquid crystal display panel 11 and the lamps 15 in order to reduce a brightness difference between the lamps 15 to widen a diffusion space of light which is generated from the lamps 15, and installs a plurality of lamps 15 to narrow a distance between the lamps 15. Accordingly, the liquid crystal display device of the related art has a disadvantage in that a thickness increases and manufacturing cost is increased. Furthermore, in the liquid crystal display device of the related art, since there is a limit to maintaining a distance between the liquid crystal display panel 11 and the lamps 15 and increase in the number of the lamps 15, there is a limit to generating a uniform brightness.

SUMMARY OF THE INVENTION

Accordingly, it is an object of the present invention to provide a liquid crystal display device that may reduce manufacturing cost, contribute to a thin profile, and generate a uniform brightness, and a fabricating method thereof.

In order to achieve these and other advantages of the invention, a liquid crystal display device according to the present invention comprises a liquid crystal display panel; and a backlight including a plurality of lamps, a diffusion plate which is located on the lamps, and an intermediate diffusion medium located between the lamps and the diffusion plate to diffuse light from the lamps, and irradiating a light to the liquid crystal display panel.

The intermediate diffusion medium may include an external band of square type formed of a diffusion medium; and a plurality of ribs formed of the diffusion medium and connected to both sides of the external band of square type, respectively.

Each of the ribs may be directly located over each of the lamps.

The ribs may include a plurality of first ribs which are directly located over the lamps; and a plurality of second ribs which are located between the first ribs.

The ribs may include a third rib which connects each of the ribs to each other at an inner space of the external band of square type.

The liquid crystal display device according to the present invention may further include a bottom cover receiving the lamps to an internal space and having an aperture part which is covered by the diffusion plate.

The liquid crystal display device according to the present invention may further include a plurality of support members installed at the bottom cover to support at least one of the ribs or the external band of square type.

The liquid crystal display device according to the present invention may further include a plurality of support members installed at the bottom cover to support at least one of the ribs or the external band of square type, and the lamps.

Another both sides of the external band of square type are directly located over the lamps.

The lamps may be any one of a cold cathode fluorescent lamp and an external electrode fluorescent lamp.

A liquid crystal display device according to the present invention comprises a liquid crystal display panel; and a backlight unit supplying light to the liquid crystal display panel, and the backlight unit includes a plurality of direct type light sources; a diffusion plate diffusing light which is emitted from the direct type light sources toward the liquid crystal display panel; and an intermediate diffusion medium located between the diffusion plate and the direct type light sources, and including a diffusion area overlapped with the direct type light sources and a transmission area not overlapping with the light sources.

A light which is emitted from the direct type light sources may be primarily dispersed by the intermediate diffusion medium, and may be secondarily dispersed by the diffusion plate.

A method of fabricating a liquid crystal display device according to the present invention comprises molding a diffusion material using a mold to form an intermediate diffusion medium that includes a plurality of ribs connected to an external band of square type and both sides of the external band of square type, respectively; and locating the intermediate diffusion medium between lamps and a diffusion plate.

BRIEF DESCRIPTION OF THE DRAWINGS

These and other advantages of the invention will be apparent from the following detailed description of the embodiments of the present invention with reference to the accompanying drawings, in which.

In the Figures.

DETAILED DESCRIPTION OF THE ILLUSTRATED EMBODIMENTS

Hereinafter, embodiments of the present invention will be described in detail with reference to FIG. 2 to FIG. 7.

Figure 2:
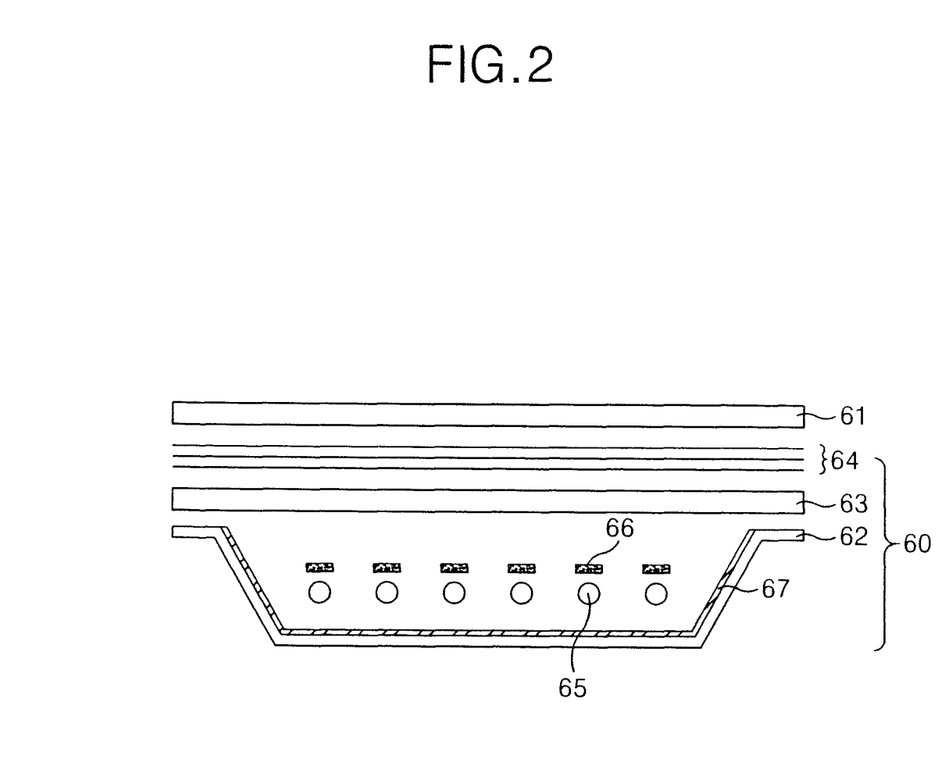
FIG. 2 is a diagram showing a liquid crystal display device according to an embodiment of the present invention.

FIG. 2 is a diagram showing a liquid crystal display device according to an embodiment of the present invention.

Referring to FIG. 2, the liquid crystal display device according to the present invention includes a liquid crystal display panel 61 and a backlight unit 60. Herein, the backlight unit 60 irradiates light to the liquid crystal display panel 61.

Liquid crystal cells are arranged in an active matrix type between an upper substrate and a lower substrate to form the liquid crystal display panel 61. A plurality of data lines and a plurality of gate lines are arranged to cross each other on the lower substrate. A thin film transistor TFT is formed at each crossing part of the plurality of data lines and the plurality of gate lines. The TFT supplies a data signal from the data line to the liquid crystal cell in response to a scanning pulse from the gate line. A gate electrode of the TFT is connected to the gate line, a source electrode of the TFT is connected to the data line. Further, a drain electrode of the TFT is connected to a pixel electrode of the liquid crystal cell. A storage capacitor, which maintains a voltage of the liquid crystal cell, is formed on a lower substrate of the liquid crystal display panel 61. The storage capacitor may be formed between the liquid crystal cell and the pre-stage gate line, and may be formed between the liquid crystal cell and a separate common line. A color filter, a common electrode, and a black matrix, for example, are formed on an upper substrate of the liquid crystal display panel 61, and a polarizing plate which filters a linear polarization is formed at the upper substrate and the lower substrate. Furthermore, an alignment film which sets a pre-tilt angle of liquid crystal molecules is formed at the upper substrate and the lower substrate. The liquid crystal molecules are driven by an electric field between a common electrode of the upper substrate and a pixel electrode of the lower substrate to modulate light incident from a backlight unit via a polarizing plate.

The backlight unit 60 includes a plurality of lamps 65, a bottom cover 62, a diffusion plate 63, a plurality of optical sheets 64, and an intermediate diffusion medium 66.

The bottom cover 62 is manufactured in a container structure where the plurality of lamps 65 are located at an inner space, and a reflection plate 67 is formed at a bottom and a side surface of the inner space.

The lamps 65 are radiated by an AC high voltage from an inverter (not shown) to generate light toward the diffusion plate 63.

The intermediate diffusion medium 66 is located on the lamps 65.

The intermediate diffusion medium 66 is located between the diffusion plate 63 and the lamps 65, and includes a diffusion area overlapped with the lamps 65 and a transmission area not overlapping with the lamps 65. Such an intermediate diffusion medium 66 includes a diffusion medium having a plurality of beads and primarily disperses light incident via the lamps 65 using the beads.

Figure 3:
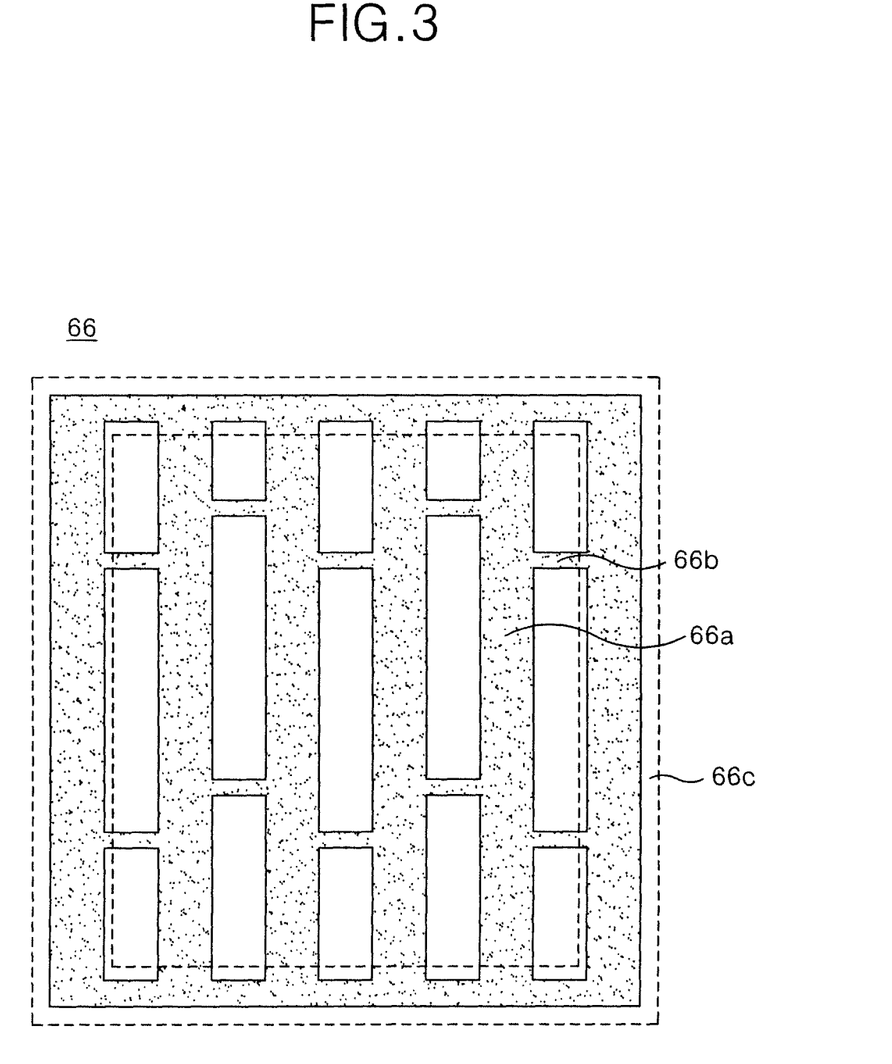
FIG. 3 is a plan view showing the intermediate diffusion medium in FIG. 2.

The intermediate diffusion medium 66 will be described in detail with reference to FIG. 3. The intermediate diffusion medium 66 is formed to have a plurality of first ribs 66a and a second rib 66b by molding a diffusion material using a mold. Herein, the plurality of first ribs 66a is connected to an external band of square type 66c and both sides of the external band of square type 66c, respectively. The second rib 66b connects the first ribs 66a to each other. A diffusion plate of the related art is manufactured by an extrusion method. However, since the intermediate diffusion medium 66 according to the present invention has a plurality of ribs, the intermediate diffusion medium 66 according to the present invention cannot be manufactured by the extrusion method. As a result, the intermediate diffusion medium 66 is manufactured by a molding method.

The first rib 66a is directly located over the lamps 65 to transmit and diffuse light which is generated from the lamps 65, and to reflect light not transmitted to the reflection plate 67. The second rib 66b connects the first ribs 66a to each other in order to prevent the first rib 66a from being transformed by its own weight and heat, and is formed to have a narrow width in order to minimize a brightness stain.

Another both sides among the external band of square type 66c of the intermediate diffusion medium 66 are directly located over the lamps 65 similar to the first rib 66a, and carry out the same function as the first rib 66a.

The diffusion plate 63 shields an aperture part of the bottom cover 62, and may be formed of the same material as the intermediate diffusion medium 66. The diffusion plate 63 secondarily disperses light which is generated from the lamps 65 to be primarily dispersed via the intermediate diffusion medium 66 and light which is reflected to the intermediate diffusion medium 66 to be incident via the reflection plate 67. In other words, the diffusion plate 63 can minimize a brightness difference which is generated by a distance difference between the liquid crystal display panel 61 and the lamp 65 and a distance difference between the lamps 65. In this case, since the diffusion plate 63 is manufactured in a structure where the beads are spread into a medium having the same refractive index, the diffusion plate 63 cannot condense light.

The optical sheets 64 include at least one diffusion sheet and at least one prism sheet to uniformly irradiate a light incident from the diffusion plate 63 to an entire liquid crystal display panel 61. Furthermore, the optical sheets 64 diffract a light progressing path toward a vertical direction regarding a display surface of the liquid crystal display panel 61 to condense light to a front surface of display surface of the liquid crystal display panel 61.

A direct type lamp such as a cold cathode fluorescent lamp CCFL and an external electrode fluorescent lamp EEFL, for example, may be used as the lamp 65.

As described above, the liquid crystal display device according to the present invention locates the intermediate diffusion medium 66 between the lamp 65 and the diffusion plate 63 to increase diffusion of light. Thus, it is not necessary to widen a diffusion space of the lamp 65, so that it becomes possible to make a thin profile of the liquid crystal display device. Furthermore, the liquid crystal display device reduces the number of lamp 65 to decrease manufacturing cost, have an excellent radiating effect, and decrease power consumption.

Figure 4:
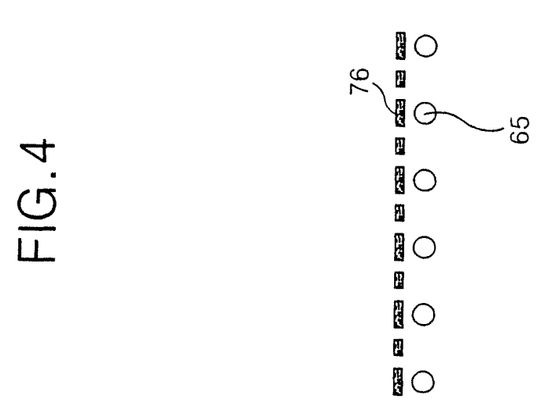
FIG. 4 is a sectional view showing an intermediate diffusion medium according to another embodiment of the present invention.
Figure 5:
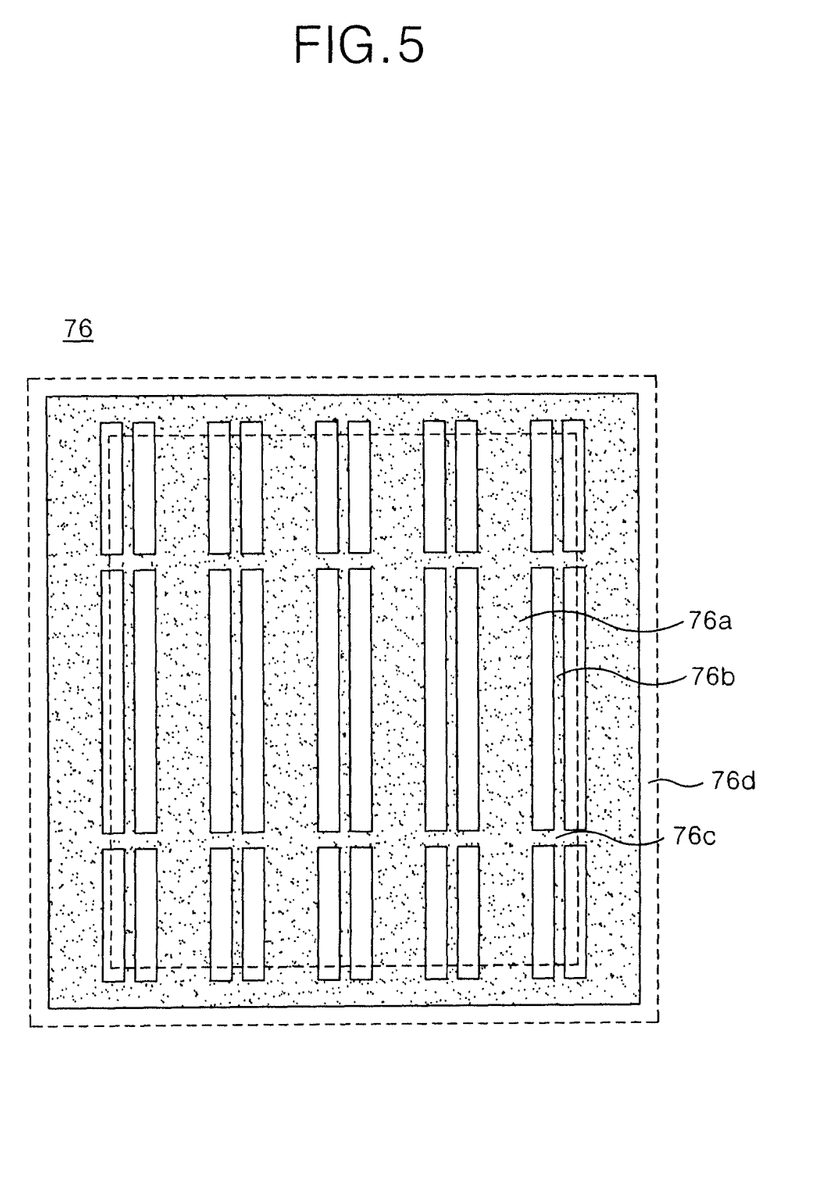
FIG. 5 is a plan view showing the intermediate diffusion medium in FIG. 4.

FIG. 4 and FIG. 5 are a sectional view and a plan view showing an intermediate diffusion medium according to another embodiment of the present invention.

Referring to FIG. 4 and FIG. 5, an intermediate diffusion medium 76 according to another embodiment of the present invention is formed to have a plurality of first ribs 76a, a second rib 76b, and a third rib 76c by molding a diffusion medium using a mold. Herein, the plurality of first ribs 76a is connected to an external band of square type 76d and both sides of the external band of square type 76d, respectively. The second rib 76b is located in parallel to the first ribs 76a between the first ribs 76a. The third rib 76c connects the first ribs 76a to the second ribs 76b.

The first rib 76a is directly located over the lamps 65 to transmit and diffuse light which is generated from the lamps 65, and to reflect light which is transmitted to the reflection plate. The second rib 76b is directly located between the first ribs 76a, that is, is directly located over between the lamps 65 to diffuse light from the lamps 65 and re-diffuses light which is not transmitted to the first rib 76a and are reflected to a reflection plate. The third rib 76c connects the first ribs 76a to the second ribs 76b in order to prevent the first rib 76a and the second ribs 76b from being transformed by its own weight and a heat, and is formed to have a narrow width in order to minimize a brightness stain.

Another both sides among the external band of square type 76d of the intermediate diffusion medium 76 are directly located over the lamps 65 similar to the first rib 76a, and carry out the same function as the first rib 76a.

Only one second rib 76b of the intermediate diffusion medium in FIG. 4 and FIG. 5 is formed between the first ribs 76a. However, at least one second rib 76b may be formed between the first ribs 76a.

Figure 6:
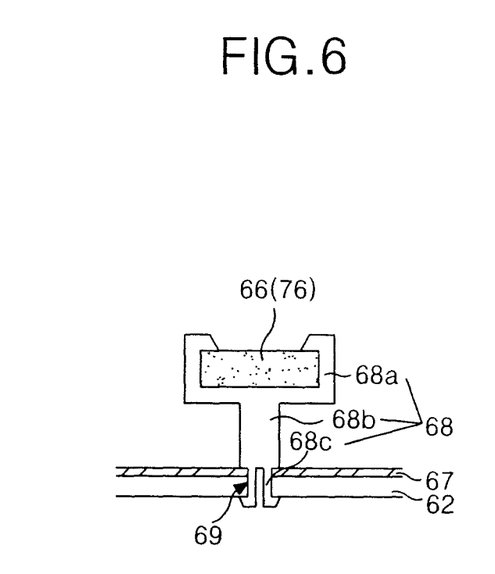
FIG. 6 is a diagram showing a support member which supports the intermediate diffusion medium according to the present invention.

FIG. 6 is a diagram showing a support member which supports the intermediate diffusion medium according to the present invention.

Referring to FIG. 6, the support member 68 includes a holder part 68a, a support part 68b, and a connecting part 68c.

The holder part 68a is formed to envelop an external band of square type of the intermediate diffusion mediums 66 and 76 or a rib, and has an aperture part to be inserted the external band of square type of the intermediate diffusion mediums 66 and 76 or the rib. The support part 68b is located between the holder part 68a and the connecting part 687c to support the holder part 68a. The connecting part 68c is formed in a substantially clamp shape in order to join the support member 68 with the bottom cover 62. The bottom cover 62 and the reflection plate 67 have a hole 69 to which the connecting part 68c is inserted.

Figure 7:
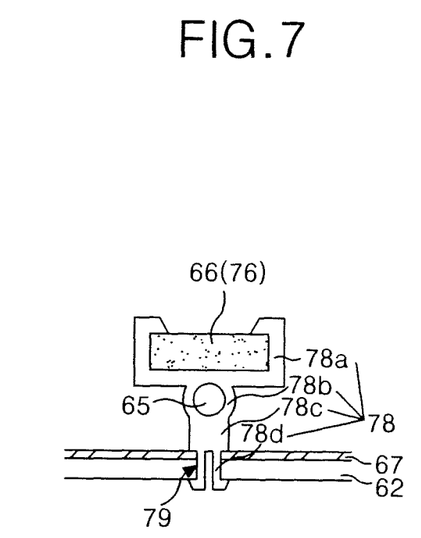
FIG. 7 is a diagram showing another example of the support member.

FIG. 7 is a diagram showing another example of the support member which supports the intermediate diffusion medium according to the present invention.

Referring to FIG. 7, the support member 78 includes a first holder part 78a, a second holder part 78b, a support part 78c, and a connecting part 78d. The first holder part 78a is formed to envelop an external band of square type of the intermediate diffusion mediums 66 and 76 or a rib, and has an aperture part to be inserted the external band of square type of the intermediate diffusion mediums 66 and 76 or the rib. The second holder part 78b is formed to envelop a round part of the lamp 65. In other words, the support member 68 in FIG. 6 plays a role to support only intermediate diffusion mediums 66 and 76. However, the support member 78 in FIG. 7 plays a role to support the intermediate diffusion mediums 66 and 76 together with the lamp 65. The support part 78c is formed to support the first holder part 78a and the second holder part 78b in order that the support member 68 is supported with the bottom cover 62 provided with the reflection plate 67. The connecting part 78d is formed in a substantially clamp shape in order to join the support member 68 with the bottom cover 62. The bottom cover 62 and the reflection plate 67 have a hole 79 to which the connecting part 78d is inserted.

As described above, the liquid crystal display device and the fabricating method thereof according to the present invention locate the intermediate diffusion medium between the lamp and the diffusion plate to increase diffusion of light. Thus, it is not necessary to widen a diffusion space of the lamp, so that it becomes possible to make a thin profile of the liquid crystal display device. Furthermore, the liquid crystal display device according to the present invention reduces the number of lamps to decrease the manufacturing cost, have an excellent radiating effect, and decrease power consumption.

Although the present invention has been explained by the embodiments shown in the drawings described above, it should be understood by those of ordinary skill in the art that the invention is not limited to the embodiments, but rather that various changes or modifications thereof are possible without departing from the spirit or scope of the invention. Accordingly, the scope of the invention shall be determined by the appended claims and their equivalents.

What is claimed is:

1. A liquid crystal display device, comprising:
   a liquid crystal display panel; and
   a backlight including a plurality of lamps, a diffusion plate which is located on the lamps, and an intermediate diffusion medium located between the lamps and the diffusion plate to diffuse light from the lamps, and irradiating light to the liquid crystal display panel,
   wherein the intermediate diffusion medium includes:
      an external band of square type formed of a diffusion medium; and
      a plurality of ribs formed of the diffusion medium and connected to both sides of the external band of square type, respectively, and
   wherein the ribs include:
      a plurality of first ribs which are directly located over the lamps;
      a plurality of second ribs which are located between the first ribs; and
      a third rib which connects each of the ribs to each other at an inner space of the external band of square type.

2. The liquid crystal display device according to claim 1, further including:
   a bottom cover receiving the lamps to an internal space and having an aperture part which is covered by the diffusion plate.

3. The liquid crystal display device according to claim 2, further including:
   a plurality of support members installed at the bottom cover to support at least one of the ribs or the external band of square type.

4. The liquid crystal display device according to claim 2, further including:
   a plurality of support members installed at the bottom cover to support at least one of the ribs or the external band of square type, and the lamps.

5. The liquid crystal display device according to claim 1, wherein another both sides of the external band of square type are directly located over the lamps.

6. The liquid crystal display device according to claim 1, wherein the lamps are any one of a cold cathode fluorescent lamp and an external electrode fluorescent lamp.

* * * * *